United States Patent [19]

Headley

[11] 3,925,737

[45] Dec. 9, 1975

[54] SIGNAL COUPLING APPARATUS

[75] Inventor: Geoffrey Allen Headley, El Paso, Tex.

[73] Assignee: GTE Sylvania Incorporated, Stamford, Conn.

[22] Filed: Nov. 18, 1974

[21] Appl. No.: 524,615

[52] U.S. Cl. .......................................... 333/6; 333/10

[51] Int. Cl.$^2$ .......................................... H03H 7/48

[58] Field of Search ........................ 333/6, 8, 10, 11

[56] References Cited

UNITED STATES PATENTS

| | | | |
|---|---|---|---|
| 3,426,298 | 2/1969 | Sontheimer et al. | 333/10 |
| 3,559,110 | 1/1971 | Wiley et al. | 333/10 |
| 3,671,885 | 6/1972 | Pennypacker | 333/10 X |
| 3,747,028 | 7/1973 | Pennypacker | 333/10 |
| 3,771,064 | 11/1973 | Hebert, Jr. | 333/10 X |
| 3,872,408 | 3/1975 | Reilly | 333/10 |

*Primary Examiner*—Paul L. Gensler
*Attorney, Agent, or Firm*—Norman J. O'Malley; Robert E. Walrath; Robert T. Orner

[57] ABSTRACT

Various embodiments of signal coupling apparatus for coupling radio frequency signals from a primary transmission path to one or more secondary transmission paths wherein low frequency power is coupled on the primary transmission path are shown. In one embodiment the low frequency power is coupled via a primary winding of a radio frequency transformer connected in series with the primary transmission path while being blocked from the secondary transmission path. In a second embodiment at least a portion of the low frequency power is coupled to the secondary transmission path. In a third embodiment the low frequency power is split between two or more secondary transmission paths.

3 Claims, 5 Drawing Figures

SIGNAL COUPLING APPARATUS

FIELD OF THE INVENTION

This invention relates to signal couplers of the type which couple radio frequency signals from a primary transmission path to one or more secondary transmission paths wherein low frequency power is coupled on the primary transmission path.

BACKGROUND OF THE INVENTION

Numerous forms of signal couplers such as directional couplers and line splitters are well known in the prior art. A particularly advantageous form of directional coupler apparatus utilizing a hybrid transformer is illustrated in M. L. Zelenz U.S. Pat. No. 3,716,806. A similar form of directional coupler is illustrated in K. A. Simons U.S. Pat. 3,048,798. Directional couplers of the type illustrated in Zelenz and Simons have various desirable characteristics which can be used advantageously in community antenna television (CATV) systems to couple signals from a primary transmission path to a secondary transmission path. One of the more significant characteristics of hybrid transformer type directional couplers is that satisfactory operation over a broad range of frequencies can be obtained.

A persistent problem in the prior art has been the routing of low frequency power around the hybrid transformer used in directional couplers and line splitters in those instances where the primary transmission path is used for transmitting power as well as radio frequency signals. Typical prior art practice utilizes a combination of radio frequency chokes and radio frequency bypass capacitors to route the low frequency power. Radio frequency chokes, however, are relatively large and expensive components thereby substantially increasing circuit size and cost. Furthermore, added costs are encountered because additional packaging and a larger housing are required for the circuit. Furthermore, the use of radio frequency chokes for power during deleteriously affects the performance of the circuit for radio frequency signals. For example, one of the deleterious effects is that radio frequency chokes increase the radio frequency signal losses by the amount of core loss which is in addition to the core loss encountered in the hybrid transformer.

OBJECTS OF THE INVENTION

Accordingly, it is a primary object of this invention to obviate the above-noted and other disadvantages of the prior art.

It is a further object of this invention to provide novel signal coupler circuitry for routing power therethrough.

It is a further object of this invention to provide novel signal coupler circuitry with superior performance.

It is a still further object of this invention to provide inexpensive and simple signal coupler circuitry with the capability of routing power therethrough.

It is a yet further object of this invention to provide novel signal coupler circuitry with the capability of routing power therethrough without deleteriously affecting the radio frequency performance thereof.

SUMMARY OF THE INVENTION

In one aspect of this invention the above and other objects and advantages are achieved in a signal coupler for coupling a portion of radio frequency signal from a primary transmission path to a secondary transmission path wherein low frequency power is coupled on the primary transmission path. The signal coupler includes first and second transformers and interconnecting means for interconnecting the first and second transformers with the primary and secondary transmission paths for coupling at least a portion of the radio frequency signal from the primary transmission path to the secondary transmission path and for coupling at least a portion of the low frequency power through at least one winding of the first transformer.

In another aspect of this invention the above and other objects and advantages are achieved in a directional coupler for coupling a portion of a radio frequency signal from a primary transmission path to a secondary transmission path wherein low frequency power is coupled on the primary transmission path. The directional coupler includes first and second transformers and blocking means. The first transformer has a primary winding connected in series with the primary transmission path and a secondary winding connected in shunt with the secondary transmission path. The second transformer has a primary winding connected in shunt with the primary transmission path and a secondary winding connected in series with the secondary transmission path. The blocking means is connected in series with the primary winding of the second transformer for blocking low frequency power.

In another aspect of this invention the above and other objects and advantages are achieved in a signal splitter for coupling a radio frequency signal from a primary transmission path to first and second secondary transmission paths wherein low frequency power is coupled on the primary transmission path. The signal splitter includes first and second transformers, blocking means, and circuit means. The first transformer has a winding connected in series with the primary transmission path, and the second transformer has a winding connected between the first and second secondary transmission paths. The blocking means is connected between the winding of the first transformer and circuit ground for blocking the low frequency power. The circuit means is connected from the winding of the first transformer to the winding of the second transformer for coupling the radio frequency signal and the low frequency power to the winding of the second transformer.

BRIEF DESCRIPTION OF THE PREFERRED EMBODIMENTS

For a better understanding of the present invention, together with other and further objects, advantages and capabilities thereof, reference is made to the following disclosure in conjunction with the accompanying drawings.

Figure 1:
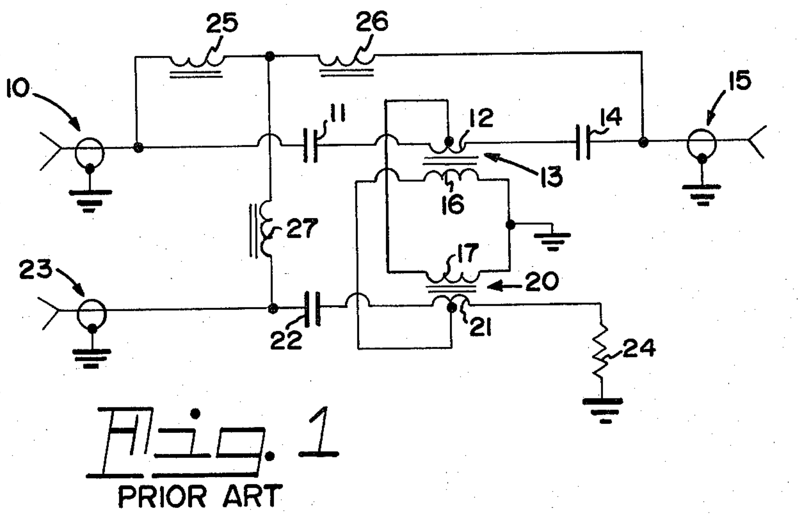
FIG. 1 PRIOR ART
FIG. 1 is a schematic diagram of a prior art directional coupler having power routing capabilities.

In FIG. 1 a directional coupler with power routing capability in accordance with the prior art is schematically illustrated. In general, a directional coupler is a signal coupler arranged such that a wave traveling in one direction in a primary path is coupled to the secondary path, but a wave traveling in the opposite direction in the primary path is not coupled to the secondary path.

In FIG. 1 an input port 10 is coupled by a radio frequency (RF) coupling capacitor 11 to a primary winding 12 of a transformer 13. The other end of primary winding 12 is connected by an RF coupling capacitor 14 to an output port 15. Transformer 13 has a secondary winding 16 with one end connected to circuit ground. A tap on primary winding 12 is connectd to one end of a primary winding 17 of a transformer 20 the other end of which is connected to circuit ground. A secondary winding 21 of transformer 20 has a tap connected to the free end of winding 16, one end connected by an RF coupling capacitor 22 to a tap port 23 and the other end connected by an idler resistor 24 to circuit ground.

RF television signals received at input port 10 are coupled via capacitor 11, primary winding 12, and capacitor 14 to output port 15 along the primary transmission path. Transformers 13 and 20 couple a portion of the signal energy of signals in the primary tranmission path to tap port 23 and idler resistor 24. The transformer coupling of transformers 13 and 20 is of an amplitude and phase such that a portion of the RF signals traveling in the forward direction in the primary transmission path are coupled principally to tap port 23 while RF signals traveling in a reverse direction are coupled principally to idler resistor 24.

In CATV systems it is ordinarily desirable to transmit low frequency power along the primary transmission path so that various amplifiers can be powered from a single power supply. The low frequency power may be transmitted in either the forward or reverse direction. In prior art FIG. 1 low frequency power is blocked from transformers 13 and 20 by capacitors 11 and 14. The power routing circuitry includes RF chokes 25 and 26 connected in series between input port 10 and output port 15 and RF choke 27 connected between the junction of chokes 25 and 26 and tap port 23. An RF decoupling capacitor can also be connected to the junction of chokes 25, 26, and 27 if desired.

Low frequency power received at either input port 10 or output port 15 is coupled to the other port via chokes 25 and 26 which block the RF signals. Choke 27 couples a portion of the power to tap port 23 while capacitor 22 blocks the low frequency power from transformers 13 and 20. In applications where low frequency power is not desired at tap port 23, choke 27 can be deleted and chokes 25 and 26 can be replaced by a single choke. As was indicated above, the RF chokes increase the RF signal losses in the signal coupler. In addition, the RF chokes are expensive and require substantial space in the circuit package.

Figure 2:
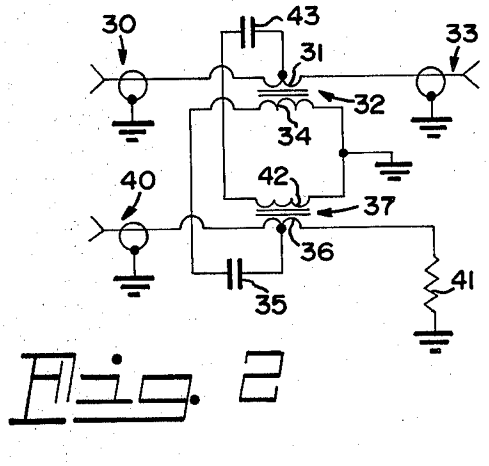
FIG. 2 is a schematic diagram of a directional coupler incorporating a first embodiment of the invention.

In FIG. 2 a directional coupler in accordance with the invention is illustrated schematically. An input means or port 30 is illustrated as an RF coupler connected to a coaxial cable. The center conductor of the coaxial cable is connected via a primary winding 31 of a transformer 32 to an output means or port 33 also illustrated as an RF coupler connected to a coaxial cable. Input means 30 and output means 33 together with the center conductors of the coaxial cables define a primary transmission path while primary winding 31 of transformer 32 is connected thereto. In the illustrated embodiment primary winding 31 is connected in series with the primary transmission path.

Transformer 32 has a secondary winding 34, one end of which is connected to a common conductor illustrated as circuit ground and the other end of which is connected by a blocking means illustrated as a capacitor 35 to a tap on a secondary winding 36 of a transformer 37. One end of secondary winding 36 is connected to an output means or tap port 40 illustrated as an RF coupler connected to a coaxial cable which define a secondary transmission path. The other end of secondary winding 36 is connected by a dummy load illustrated as an idler resistor 41 to circuit ground. Accordingly, secondary winding 34 of transformer 32 is connected in shunt with the secondary transmission path as well as in shunt with idler resistor 41 while secondary winding 36 of transformer 37 is connected to the secondary transmission path and idler resistor 41 by being connected in series therebetween.

Transformer 37 has a primary winding 42, one end of which is connected to circuit ground and the other end is connected by a blocking means illustrated as a capacitor 43 to a tap on primary winding 31 of transformer 32. Accordingly, primary winding 42 is connected in shunt with the primary transmission path. While connections to taps on windings 31 and 36 are illustrated, those skilled in the art will realize that the arrangement shown in U.S. Pat. No. 3,716,806 can be used as well.

Transformers 32 and 37 are interconnected with the primary and secondary transmission paths for coupling at least a portion of the RF signals traveling along the primary transmission path to the secondary transmission path. In the illustrated embodiment RF signals traveling along the primary transmission path in either direction are coupled through primary winding 31 of transformer 32 and across primary winding 42 of transformer 37. The signals induced in secondary windings 34 and 36 are of amplitudes and phases such that a portion of the signal energy of RF signals traveling in the forward direction is coupled to port 40 while a portion of the RF signals traveling in the reverse direction is coupled to idler resistor 41. Accordingly, the RF operation of the embodiment of FIG. 2 is substantially the same as that described for FIG. 1.

Low frequency power coupled on the primary transmission path is coupled through winding 31 of transformer 32 from input port 30 to output port 33 or vice versa. Capacitor 43 blocks the low frequency power from primary winding 42 of transformer 37. Similarly, capacitor 35 blocks low frequency power induced in secondary winding 34 of transformer 32. Considering the turns ratio of transformer 32 as used in typical directional couplers, very little power will be induced in secondary winding 34 and in some cases capacitor 35 may not be necessary.

Figure 3:
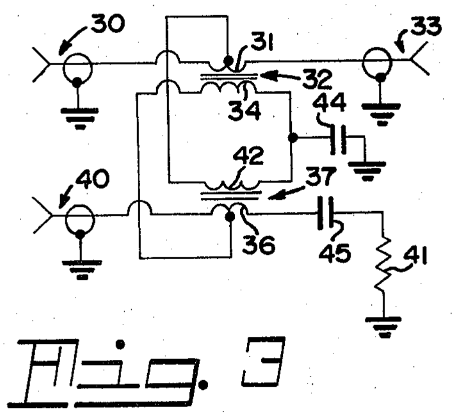
FIG. 3 is a schematic diagram of a directional coupler incorporating a second embodiment of the invention.

FIG. 3 is a schematic illustration of a second embodiment of the invention wherein low frequency power is also coupled to the secondary transmission path. In FIG. 3 capacitors 35 and 43 are removed. Primary winding 42 of transformer 37 and secondary winding 34 of transformer 32 are connected to circuit ground through a blocking means illustrated as a capacitor 44 instead of being connected directly to circuit ground. A blocking means illustrated as a capacitor 45 is connected between secondary winding 36 of transformer 37 and idler resistor 41.

The RF operation of the embodiment of FIG. 3 is substantially the same as that described for FIG. 2. In FIG. 3, however, the low frequency power is coupled through the series connection of primary winding 42 of transformer 37 and secondary winding 34 of transformer 32 to the secondary transmission path. Capacitor 45 blocks the low frequency power from idler resistor 41 so that all of the power coupled to the secondary transmission path is coupled to port 40 rather than a portion being wasted in resistor 41. Capacitor 44 provides an RF ground for windings 34 and 42 while blocking the low frequency power.

RF signal distortion which can be caused by saturation of the transformer core material by the low frequency power is preferably minimized by one or more of the following steps. First, the number of turns on the transformer is minimized. Second, the core material is selected to have the minimum permeability required for good RF performance over the desired frequency range. Third, the core is provided with sufficient magnetic path length to operate in the "linear" portion of the hysteresis curve of the core material for the low frequency power requirements. Fourth, a controlled air gap can be introduced in the magnetic core path where necessary or desired.

Figure 4:
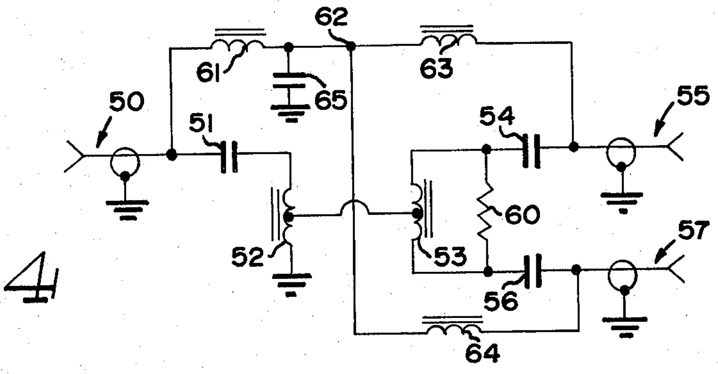
FIG. 4 PRIOR ART
FIG. 4 is a schematic diagram of a prior art signal splitter having power routing capabilities.

FIG. 4 is a schematic illustration of a prior art signal coupler of the signal splitter type which splits a radio frequency signal on a primary transmission path between two or more secondary transmission paths by coupling a portion of the RF signal to each secondary transmission path. Signal couplers of this type are typically used to divide an RF signal between two or more lines and can be used, but are not necessarily used, with a directional coupler of the type illustrated in FIGS. 2 and 3. For example, the RF signals at tap port 40 of FIG. 3 can be divided by a signal splitter between a plurality of secondary transmission paths. For this purpose, the secondary transmission path of FIG. 3 becomes a primary transmission path of FIGS. 4 or 5. The signal splitter can also be used to divide the signal of the primary transmission path at output port 33 of FIGS. 2 or 3. In yet another example, the signal splitter can be used to split the signal on a primary transmission path and input port 30 can be part of one of the secondary transmission paths of the signal splitter. Those skilled in the art will realize that the various possible combinations of directional couplers and signal splitters are not limited by the above examples and that directional couplers and signal splitters can be used independently of each other.

In prior art FIG. 4 an input port 50 is connected by an RF coupling capacitor 51 to a transformer 52 illustrated as an autotransformer with a single winding connected between coupling capacitor 51 and circuit ground. A tap on the winding of transformer 52 is connected to a tap on a winding of a transformer 53 also illustrated as an autotransformer with a single winding connected between first and second secondary transmission paths. One end of the winding of transformer 53 is connected by an RF coupling capacitor 54 to an output port 55. The other end of the winding of transformer 53 is connected by an RF coupling capacitor 56 to an output port 57. Ports 55 and 57 are included in first and second secondary transmission paths. An isolation resistor 60 is connected in parallel with the winding of transformer 53.

In RF operation RF signals are coupled across the winding of transformer 52 and are coupled from the tap thereof to the tap of the winding of transformer 53. Transformer 53 splits the RF signal between the two secondary transmission paths illustrated in FIG. 4.

In those cases where low frequency power is included on the primary transmission path and it is desired to couple the low frequency power to the secondary transmission paths, typical prior art signal splitters include an RF choke 61 connected between input port 50 and a junction 62. Junction 62 is coupled by an RF choke 63 to output port 55 and by an RF choke 64 to output port 57. An RF decoupling capacitor 65 can be connected from junction 62 to circuit ground if desired. The operation of the power coupling circuitry of FIG. 4 is similar to that illustrated and described in FIG. 1 and possesses similar disadvantages. If low frequency power is desired on only one secondary transmission path, only one RF choke may be necessary to couple input port 50 to the desired output port.

Figure 5:
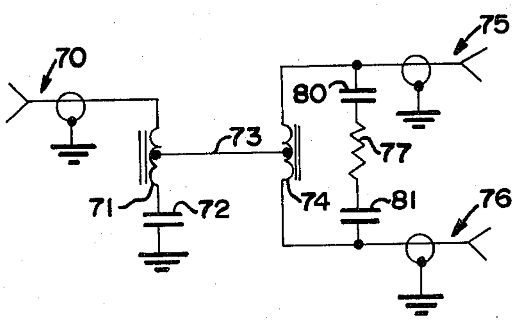
FIG. 5 is a schematic diagram of a signal splitter incorporating a third embodiment of the invention.

In FIG. 5 input means or port 70, illustrated as an RF coupler connected to a coaxial cable, is connected by a transformer 71 and a blocking means illustrated as an RF coupling capacitor 72 to a common conductor illustrated as circuit ground. Transformer 71 is illustrated as an autotransformer with a single winding connected in series with a primary transmission path. Capacitor 72 is connected between the winding of transformer 71 and circuit ground to block low frequency power while providing an RF ground for transformer 71. A tap on the winding of transformer 71 is connected by circuit means 73 illustrated as a direct connection to a winding of a second transformer 74 also illustrated as an autotransformer with a single winding with connection 73 being made to a tap thereon. The respective ends of the winding of transformer 74 are connected to output means or ports 75 and 76, respectively, both illustrated as RF couplers connected to coaxial cables. RF coupling capacitors 80 and 81 can be connected in series with isolation resistor 77 in parallel with the winding of transformer 74 if necessary to block the low frequency power therefrom.

The RF operation of FIG. 5 is similar to that of FIG. 4. RF signals on the primary transmission path are coupled across transformer 71 and via circuit means 73 to transformer 74 which splits the RF signals between the first and second secondary transmission paths including output ports 75 and 76. The low frequency power on the primary transmission path is also coupled to transformer 71. Capacitor 72 causes the low frequency power to be routed through circuit means 73 to transformer 74 which divides the low frequency power between the secondary transmission paths. The design considerations for the transformers 71 and 74 are similar to those discussed above with respect to FIGS. 2 and 3. Also, if low frequency power is desired on only one secondary transmission path, RF coupling capacitors can be used to block the low frequency power from the other secondary transmission path so that all of the low frequency power is coupled to the desired secondary transmission path.

Accordingly, there has been shown various forms of signal couplers of the directional coupler and signal splitter type which couple a portion of an RF signal from a primary transmission path to a secondary transmission path wherein low frequency power is coupled on the primary transmission path. The invention permits the elimination of relatively expensive and bulky RF chokes which deleteriously affect the RF performance of the signal coupler and add to the size and expense of the signal coupler.

While there has been shown and described what is at present considered the preferred embodiment of the invention it will be obvious to those skilled in the art that various changes and modifications may be made therein without departing from the invention as defined by the appended claims.

What is claimed is:

1. A directional coupler for coupling a portion of a radio frequency signal from a primary transmission path to a secondary transmission path wherein low frequency power is coupled on said primary transmission path comprising:

a first transformer having a primary winding connected in series with said primary transmission path and a secondary winding connected in shunt with said secondary transmission path;

a second transformer having a primary winding connected in shunt with said primary transmission path and a secondary winding connected in series with said secondary transmission path;

a first capacitor connected in series with said primary winding of said second transformer for blocking low frequency power therefrom; and a second capacitor connected in series with said secondary winding of said first transformer for blocking low frequency power induced therein.

2. A signal splitter for coupling a radio frequency signal from a primary transmission path to first and second secondary transmission paths wherein low frequency power is coupled on said primary transmission path comprising:

a first autotransformer having a winding connected in series with said primary transmission path;

blocking means connected between said winding and circuit ground for blocking said low frequency power;

a second autotransformer having a winding connected between said first and second secondary transmission paths; and a connection from a tap on the winding of said first autotransformer to a tap on the winding of said second autotransformer for coupling said radio frequency signal and said low frequency power to said winding of said second autotransformer.

3. A signal splitter as defined in claim 2 wherein said blocking means is a capacitor.

* * * * *